(12) United States Patent
Peng et al.

(10) Patent No.: US 8,456,828 B2
(45) Date of Patent: Jun. 4, 2013

(54) HARD DISK DRIVE ASSEMBLY

(75) Inventors: Wen-Tang Peng, Taipei Hsien (TW); Zhe Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 289 days.

(21) Appl. No.: 12/912,968

(22) Filed: Oct. 27, 2010

(65) Prior Publication Data
US 2012/0075792 A1    Mar. 29, 2012

(30) Foreign Application Priority Data
Sep. 23, 2010   (CN) .......................... 2010 1 0289308

(51) Int. Cl.
*G06F 1/16*   (2006.01)
(52) U.S. Cl.
USPC ................... 361/679.33; 248/442.1; 312/244; 165/80.2

(58) Field of Classification Search
USPC .................. 248/305, 449, 458, 213.2, 442.1; 361/679.01, 679.02, 679.03, 679.08, 679.31, 361/679.32, 679.33, 679.34, 679.37; 312/330.1, 312/223.1, 223.2, 223.3, 186, 244; 165/122, 165/104.26, 104.33, 104.21, 80.2; 360/97.01
See application file for complete search history.

(56) References Cited

U.S. PATENT DOCUMENTS

| | | | | |
|---|---|---|---|---|
| 7,379,294 | B2 * | 5/2008 | Chen ......................... | 361/679.33 |
| 7,626,810 | B1 * | 12/2009 | Kim et al. ................. | 361/679.33 |
| 2009/0097196 | A1 * | 4/2009 | Peng et al. ............... | 361/679.34 |

FOREIGN PATENT DOCUMENTS

TW    M387457 U1    8/2010

* cited by examiner

*Primary Examiner* — Hung Duong
(74) *Attorney, Agent, or Firm* — Altis Law Group, Inc.

(57) ABSTRACT

A hard disk drive (HDD) assembly includes an HDD rack and a dummy HDD. The rack includes a front wall and two sidewalls perpendicularly extending from opposite ends of the front wall. A number of spaced fixing holes are respectively defined in each of the sidewalls. A number of protrusions extend from opposite ends of the dummy HDD and engage with the corresponding fixing holes of the rack.

5 Claims, 4 Drawing Sheets

HARD DISK DRIVE ASSEMBLY

BACKGROUND

1. Technical Field

The present disclosure relates to an assembly which readily secures hard disk drives (HDDs).

2. Description of Related Art

In computer systems, HDDs are generally fixed to HDD racks. However, HDD racks may easily deform if not being used to hold HDDs after a long time.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
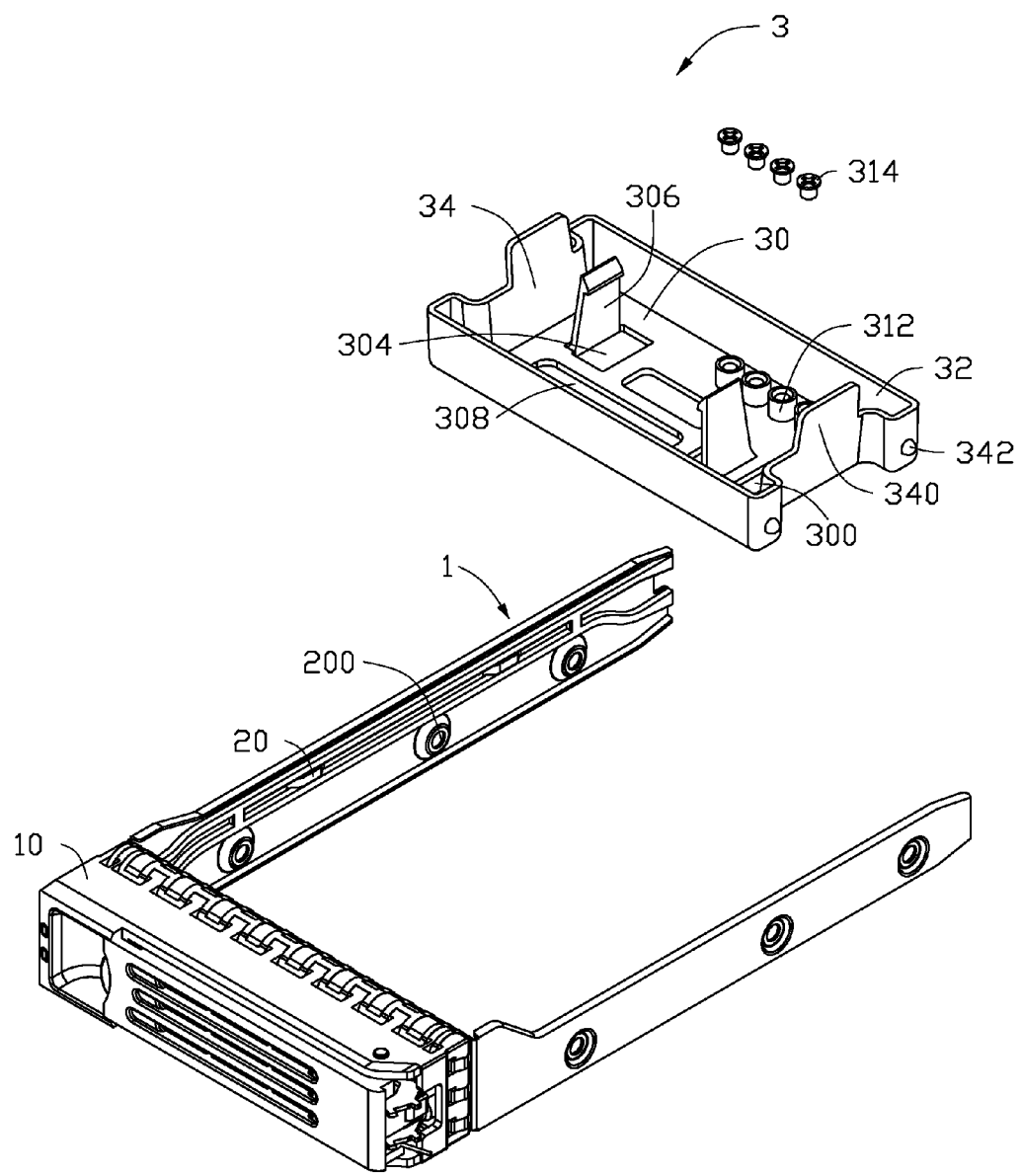
FIG. 1 is an exploded, isometric view of an exemplary embodiment of an assembly for a hard disk drive (HDD), the assembly including an HDD rack and a dummy HDD.
Figure 2:
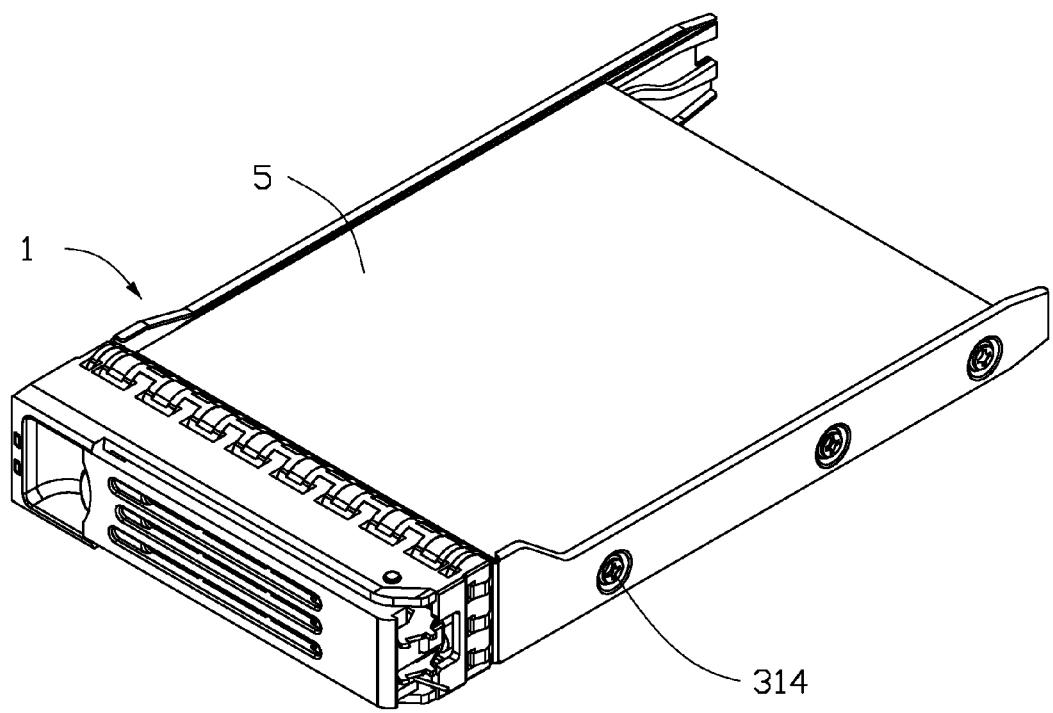
FIG. 2 is an assembled, isometric view of the HDD rack of FIG. 1 with a HDD.

Referring to FIG. 1, an exemplary embodiment of a hard disk drive (HDD) assembly is used to mount an HDD 5 (shown in FIG. 2). The assembly includes an HDD rack 1 and a dummy HDD 3.

The HDD rack 1 includes a front wall 10 and two sidewalls 20 perpendicularly extending from opposite ends of the front wall 10. A number of spaced fixing holes 200 are defined in each of the sidewalls 20.

The dummy HDD 3 includes a board 30, two first plates 32 extending up from opposite sides of the board 30, and two U-shaped second plates 34 extending up from opposite U-shaped ends of the board 30. The first plates 32 and the concave portions of the second plates 34 slant away from the board 30. In one embodiment, an angle between each of the first plates 32 and the board 30 is about 91 degrees, and an angle between the concave portion of each of the second plates 34 and the board 30 is about 97 degrees.

The board 30 defines a first slot 300 and a second slot 304 adjacent to the second plates 34, and a slot 308 adjacent to one of the first plates 32. Two opposing latches 306 extend from the board 30 adjacent to the second plates 34 respectively between the first and second slots 300 and 304. A number of spaced posts 312 defining inner threads extend up from the board 30, adjacent to the other first plate 32, for engaging with a number of fasteners 314 that fix the HDD 5 to the HDD rack 1. A blocking portion 340 extends from a top of the concave portion of each second plate 34. Two protrusions 342 extend out from opposite ends of each second plate 34.

Referring to FIG. 2, in assembling the HDD 5 to the HDD rack 1, the HDD 5 is accommodated among the front wall 10 and the sidewalls 20, with the fixing holes 200 of the sidewalls 20 aligning with corresponding fixing holes (not shown) defined in opposite sides of the HDD 5. The fasteners 314 are removed from the posts 312 of the dummy HDD 3, and extend through the fixing holes 200 of the sidewalls 20 to engage in the fixing holes of the HDD 5. Therefore, the HDD 5 is mounted to the HDD rack 1.

Figure 3:
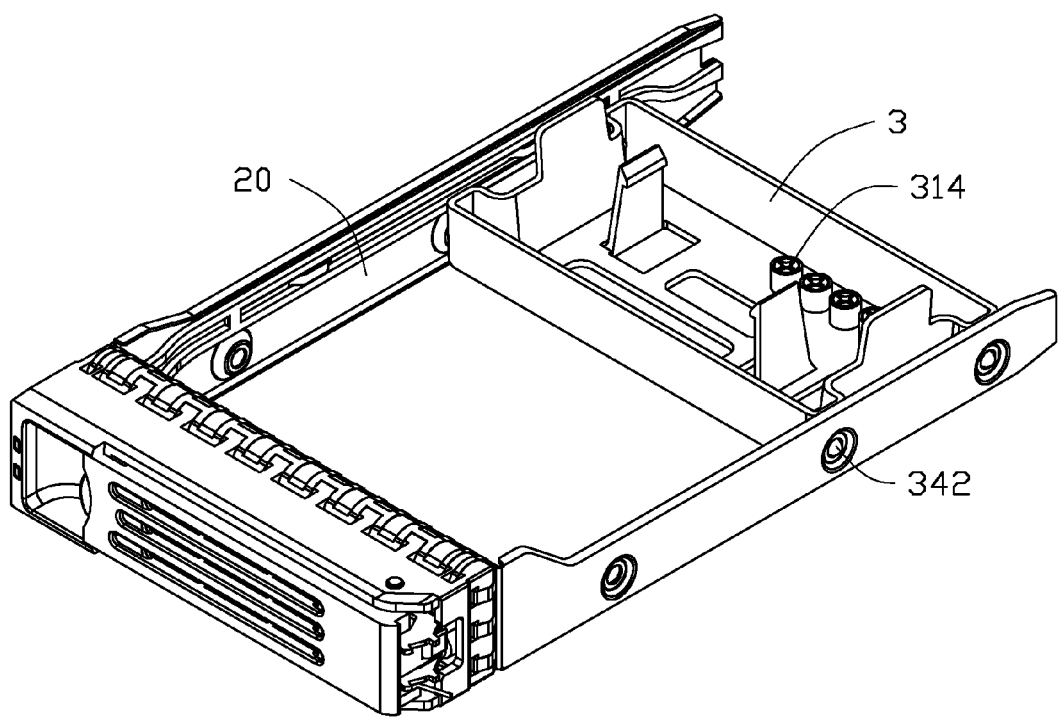
FIG. 3 is an assembled, isometric view of the assembly of FIG. 1.

Referring to FIG. 3, when there is no HDD 5 to be mounted to the HDD rack 1, the dummy HDD 3 is located between the sidewalls 20, with the protrusions 342 of the dummy HDD 3 engaged in the corresponding fixing holes 200 of the sidewalls 20, and the fasteners 314 are screwed to the posts 312. Thereby, the HDD rack 1 does not get twisted and the fasteners 314 do not get lost.

Figure 4:
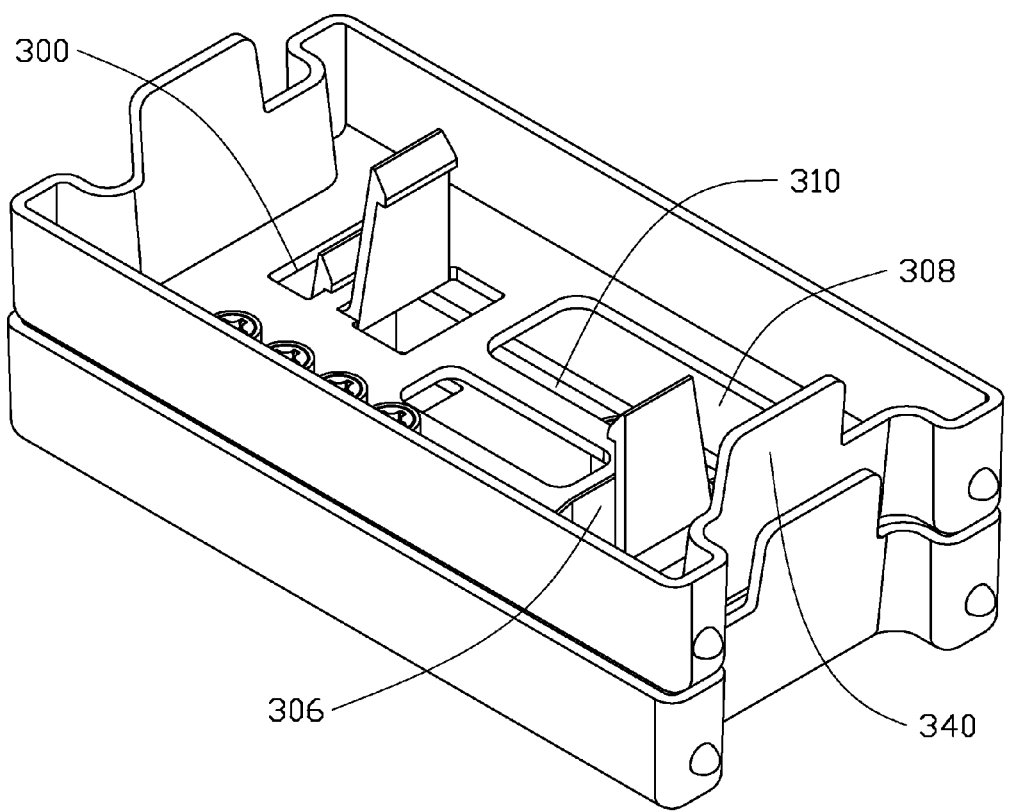
FIG. 4 is an assembled, isometric view of the dummy HDD of FIG. 1 and another dummy HDD.

Referring to FIG. 4, after the dummy HDD 3 is removed from the HDD rack 1, the dummy HDD 3 can be piled up with another dummy HDD 3. The posts 312 of the lower dummy HDD 3 are located under the third slot 308 of the upper dummy HDD 3. The latches 306 of the lower dummy HDD 3 are engaged with the first and second slots 300 and 304 of the upper dummy HDD 3, and the posts 312 of the lower dummy HDD 3 align with the third slot 308 of the upper dummy HDD 3. The blocking portions 340 of upper dummy HDD 3 overlap with the blocking portions 340 of the lower dummy HDD 3. Therefore, the dummy HDDs 3 can be piled up together and can be moved and stored conveniently.

It is believed that the present embodiments and their advantages will be understood from the foregoing description, and they will be apparent that various changes may be made thereto without departing from the spirit and scope of the description or sacrificing all of their material advantages, the examples hereinbefore described merely being embodiments.

What is claimed is:

1. A hard disk drive (HDD) assembly, the assembly comprising:
   an HDD rack comprising a front wall and two sidewalls substantially perpendicularly extending from opposite ends of the front wall, wherein a plurality of spaced fixing holes is defined in each of the sidewalls; and
   a dummy HDD comprising a board and a plurality of protrusions extending from opposite ends of the board;
   wherein the dummy HDD is accommodated among the front wall and the sidewalls, with the plurality of protrusions engaged in the corresponding fixing holes of the HDD rack, when an HDD is not mounted to the HDD rack; and
   wherein opposite ends of the board are U-shaped, the dummy HDD further comprises two first plates extending from opposite sides of the board and two U-shaped second plates extending up from the opposite ends of the board, the first plates and concave portions of the second plates slanting away from the board.

2. The assembly of claim 1, wherein the number of the protrusions is four, and two of the protrusions extend from opposite ends of each second plate respectively.

3. The assembly of claim 2, wherein a blocking portion extends from a top of the concave portion of each second plate.

4. The assembly of claim 1, wherein the board defines a first slot and a second slot adjacent to the second plates, respectively, and two latches facing to each other extend from the board between the first slot and the second slot.

5. The assembly of claim 1, wherein the board defines a slot adjacent to one of the first plates, a plurality of spaced post extends up from the board and adjacent to the other first plate, the plurality of posts defines inner threads for engaging with a plurality of fasteners extending through the corresponding fixing holes of the HDD rack to engage in the HDD, thereby fixing the HDD to the HDD rack.

* * * * *